T 856,047

T856047

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 26, 1968

856 O.G. 1021

717,416

PHENOXAZONIUM COMPOUNDS

David J. Wallace and John I. Dale III, both % Tennessee Eastman Company, P.O. Box 511, Kingsport, Tenn. 37662

Filed Mar. 29, 1968. Published Nov. 26, 1968

Class 260—243

No Drawing. 14 Pages Specification

Phenoxazonium cations having the formula:

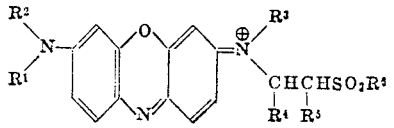

wherein $R^1$ is hydrogen, a lower alkyl radical, or a phenyl radical;

$R^2$ is hydrogen or a lower alkyl radical;

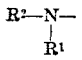

taken collectively represent morpholino or piperidino;

$R^3$ is a lower alkyl radical;

$R^4$ and $R^5$ are the same or different and each is hydrogen or lower alkyl;

$R^6$ is vinyl or the group $—CH_2CH_2—R^7$ wherein R is a lower alkylthio radical, an arylthio radical, a dicarboximido radical, a lower alkylamino radical, an arylamino radical, morpholino, or piperidino; and

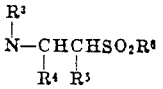

taken collectively represent a morpholino-1,1-dioxide group are disclosed.

The compounds are prepared according to known procedures by reacting the appropriate p-nitrosoarylamine with the appropriate m-aminophenol in the presence of a strong acid. The disclosed compounds are useful as dyes for polyacrylonitrile and acid modified polyester textile materials.